(12) United States Patent
Oliveira et al.

(10) Patent No.: US 11,297,110 B2
(45) Date of Patent: Apr. 5, 2022

(54) LOAD BALANCING FOR CONTROL SESSION AND MEDIA SESSION IN A COMMUNICATION FLOW

(71) Applicant: Arista Networks, Inc., Santa Clara, CA (US)

(72) Inventors: Robert Luis Almeida Oliveira, Dublin (IR); José Rios Cerqueira Neto, Nicklow (IR)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/843,827

(22) Filed: Apr. 8, 2020

(65) Prior Publication Data

US 2021/0320952 A1 Oct. 14, 2021

(51) Int. Cl.
  *H04L 29/06* (2006.01)
  *H04L 12/853* (2013.01)
  *H04L 29/08* (2006.01)
  *H04L 65/10* (2022.01)
  *H04L 47/2416* (2022.01)
  *H04L 67/1008* (2022.01)
  *H04L 65/1069* (2022.01)

(52) U.S. Cl.
  CPC ...... *H04L 65/1006* (2013.01); *H04L 47/2416* (2013.01); *H04L 65/1069* (2013.01); *H04L 67/1008* (2013.01)

(58) Field of Classification Search
  CPC ............. H04L 65/1006; H04L 65/1069; H04L 47/2416; H04L 67/1008; H04L 67/1002; H04L 67/1027; H04L 67/1034; H04L 29/08252; H04L 67/101; H04L 67/1021; H04L 67/1023; H04L 67/142
  See application file for complete search history.

(56) References Cited

U.S. PATENT DOCUMENTS

| | | | |
|---|---|---|---|
| 2005/0261985 A1* | 11/2005 | Miller | G06Q 10/06 709/223 |
| 2006/0064478 A1* | 3/2006 | Sirkin | H04L 29/12783 709/223 |
| 2006/0224744 A1* | 10/2006 | Rao | H04L 67/1002 709/227 |
| 2006/0277596 A1* | 12/2006 | Calvert | H04L 67/02 726/3 |

(Continued)

OTHER PUBLICATIONS

J. Rosenberg et al, "RFC 3261-SIP: Session Initiation Protocol", Internet Engineering Task Force, Jun. 2002, 270 pages.
E. Ivov Jitsi et al, "Latching: Hosted NAT Traversal (HNT) for Media in Real-Time Communication", Internet Engineering Task Force, Sep. 2014, 17 pages.

(Continued)

*Primary Examiner* — David R Lazaro
(74) *Attorney, Agent, or Firm* — Fountainhead Law Group P.C.

(57) ABSTRACT

Techniques described herein relate to a method for load balancing. In one or more embodiments, the method selects a server from a plurality of servers to process a communication from a host. Network details for the server and the host are saved during a control session to set up the communication. Then, the method stores the network details in a rule in a data plane and relays media traffic between the host and the server for a media session for the communication using the network details in the rule in the data plane.

20 Claims, 10 Drawing Sheets

(56) References Cited

U.S. PATENT DOCUMENTS

| | | | | |
|---|---|---|---|---|
| 2007/0165622 | A1* | 7/2007 | O'Rourke | H04L 67/1002 370/389 |
| 2008/0101335 | A1* | 5/2008 | Badger | H04L 65/1006 370/352 |
| 2009/0259768 | A1* | 10/2009 | McGrath | H04L 67/101 709/241 |
| 2010/0154047 | A1* | 6/2010 | Roach | H04L 65/105 726/9 |
| 2011/0225594 | A1* | 9/2011 | Iyengar | G06F 9/505 718/105 |
| 2011/0252127 | A1* | 10/2011 | Iyengar | G06F 9/5033 709/224 |
| 2014/0330976 | A1* | 11/2014 | van Bemmel | H04L 69/16 709/226 |
| 2016/0026683 | A1* | 1/2016 | Sah | G06F 16/2453 707/770 |
| 2016/0080505 | A1* | 3/2016 | Sahin | H04L 67/1027 709/229 |
| 2016/0149965 | A1* | 5/2016 | Kubik | H04L 65/1016 370/259 |
| 2016/0226922 | A1* | 8/2016 | Russell | H04L 65/1016 |
| 2016/0352867 | A1* | 12/2016 | Subbarayan | H04L 41/0893 |
| 2017/0251028 | A1* | 8/2017 | Bollapalli | H04L 65/1006 |
| 2018/0077229 | A1* | 3/2018 | Bharrat | H04L 65/1006 |
| 2019/0364101 | A1* | 11/2019 | Ramakrishnan | H04L 65/1083 |
| 2021/0044643 | A1* | 2/2021 | Bouvet | H04L 65/60 |

OTHER PUBLICATIONS

Brekeke, "Load balancing for High Availability SIP/VoIP Services", http://wiki.brekeke.com/wiki/Load-balancing-for-High-Availability-SIPVoIP-services, Apr. 8, 2020, 1 page.

"Session Initiation Protocol (SIP Tutorial: SIP to PSTN Call Flow)", https://www.eventhelix.com/RealtimeMantra/Telecom/SIP_PSTN_Call_Flow.pdf, Jun. 5, 2010, 7 pages.

"Round-robin DNS", https://en.wikipedia.org/wiki/Round-robin_DNS, Mar. 2, 2020, 2 pages.

AskF5, "Manual Chapter: Configuring SIP Load Balancing", https://support.f5.com/kb/en-us/products/big-ip_ltm/manuals/product/ltm-implementations-12-1-0/40.html, Apr. 10, 2020, 7 pages.

Redhat, "JBoss Communications Platform 5.1", https://access.redhat.com/documentation/en-US/JBoss_Communications_Platform/5.1/html-single/SIP_Load_Balancer_User_Guide/, 23 pages (2011).

Radware,"VoIP Load Balancing", https://www.radware.com/resources/voip_load_balancing.aspx, Apr. 10, 2020, 3 pages.

"F5 Big-IP LBaaS Plug-in", https://access.redhat.com/ecosystem/software/1446683, Apr. 10, 2020, 4 pages.

Ask5F5 "Manual Chapter: Configuring SIP Load Balancing", https://techdocs.f5.com/kb/en-us/products/big-ip_ltm/manuals/product/bigip-service-provider-message-routing-administration-13-1-0/4.html; 10 pages; Jan. 2021.

"Managing Network Resources"; https://docs.oracle.com/html/E13806_01/network.htm, 15 pages, Jan. 2006.

* cited by examiner

| No | PROTOCOL | SRC-IP | SRC-PORT | DST-IP | DST-PORT | ACTION | ACTION |
|---|---|---|---|---|---|---|---|
| 1 | udp | 10.0.0.1 | 6000 | 10.0.0.254 | 9000 | set dst-ip to 192.168.1.1 | set dst-port to 9000 |
| 2 | udp | 192.168.1.1 | 9000 | 10.0.0.1 | 6000 | set src-ip to 10.0.0.254 | set src-port to 9000 |

LOAD BALANCING FOR CONTROL SESSION AND MEDIA SESSION IN A COMMUNICATION FLOW

BACKGROUND

In a communication from a host to a destination, an intermediary may be inserted in the communication. The intermediary may serve as a proxy that mediates the media traffic. For example, when a host wants to contact the destination, the host starts a connection with a network device that serves as the intermediary and then the network device starts another connection with the original destination of the communication. Thus, all traffic crosses the network device before reaching the destination. This may allow a service provider to control the connection, such as the service provider can perform operations such as logging, quality of service (QoS) shaping, charging based on data consumption, etc.

The communication may use a protocol, such as session initiation protocol (SIP), that requires a SIP server to process the communication. In some examples, the service provider may have multiple SIP servers that can process the communication. The network device may balance the load by selecting a SIP server that may have less load, which may reduce the delay in data being exchanged and provide a better user experience.

Session initiation protocol uses a control session and a media session. The control session negotiates the parameters of the communication that will be used, such as the ports of the host and server that are used. Then, once the negotiation is finished, the media session can start. However, if the traditional load balancing methodology is used, the network device may select different SIP servers for the control session and the media session based on load. If this occurs, different SIP servers may process the control session and the media session, which may result in an error because the same server should process the control session and the media session.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a load balancing system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A network device may sit in between a host (e.g., a caller) and multiple servers. The network device may be a switch or router that performs load balancing to select one of the servers to process a communication (e.g., a call) between the host and a selected server. A protocol, such as session initiation protocol (SIP), may use two sessions, a control session to set up network details for the communication and a media session in which media for the communication is transferred. During the control session, a control plane of the network device selects a SIP server and relays messages required to set up the network details for the communication between the host and the SIP server. One requirement may be that the selected SIP server in the control session should be the server used in the media session. The control plane collects some network details negotiated between the selected SIP server and the host for the communication. Then, the control plane saves the collected network details in a memory of the network device. For example, the control plane saves the addresses and ports that the host and the selected SIP server will use in the media session.

During the media session, the network device uses the network details to forward media traffic between the host and the SIP server. For example, the network details may be stored in a forwarding table in memory. The network device can then forward traffic at wire speed without having to contact any process running in the control plane or running on a separate computer chip, such as a computer processing unit (CPU).

System

Figure 1:
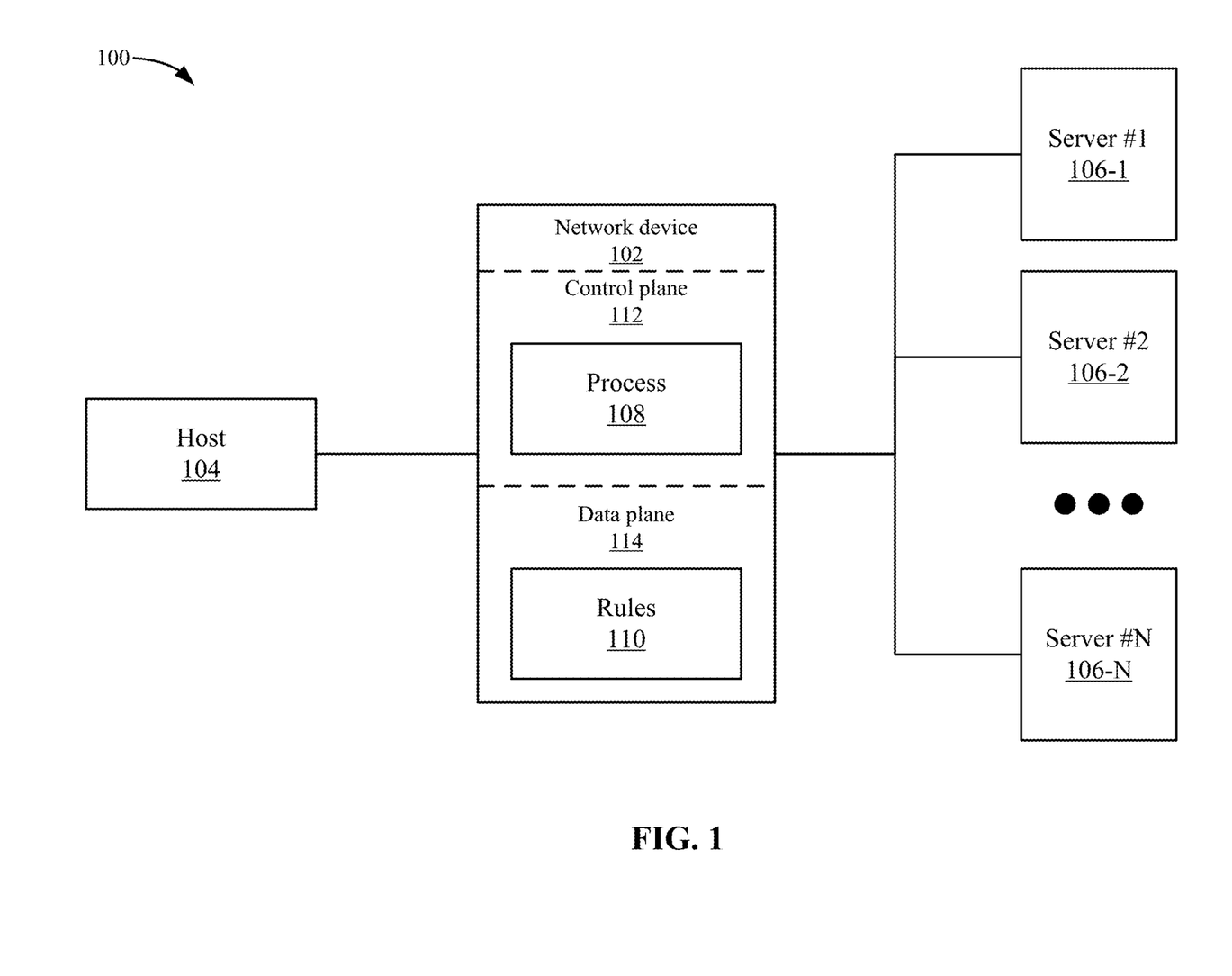
FIG. 1 depicts a simplified system for performing load balancing for a call according to some embodiments.

FIG. 1 depicts a simplified system 100 for performing load balancing for a call according to some embodiments. System 100 includes a network device 102 that sits in between a host 104 and a plurality of servers 106-1 to 106-N. Although a single host is described, it is noted that a second host (or more hosts) may be included in the communication, such as on the other side of servers 106. Additionally, another network device 102 may be included as an intermediary between the server and the second host. That is, the structure shown in FIG. 1 may be replicated for a second side of the communication.

Host 104 may initiate a communication to a destination, such as a second host or to a server 106. The communication may be referred to as a call, which may be a telephone call in which media will be carried in the call, such as voice, video, and messaging. However, other communications that use a control session and a media session may be appreciated. Host 104 may be a computing device that uses a protocol, such as session initiation protocol (SIP). The SIP protocol describes a method for host 104 to establish and maintain a session for the call. Session description protocol (SDP) is a protocol that can be used to carry information in SIP message, and describes the content of a media session, its nature, and the network details needed to access the content. SDP may describe the media exchange and the network details needed to download the media. A message may be transported in a packet that may have a layout that has many fields for different types of information, including a network address where the media is reachable (e.g., its Internet protocol (IP) address) and the service providing the media (e.g., the Transfer Control Protocol (TCP) or Uniform Datagram Protocol (UDP) port that the other end of the communication is expecting requests from). Although SIP and SDP are described, other protocols may be appreciated.

Network device 102 may be an intermediary, such as a proxy, that sits in between communications between host 104 and servers 106. In some embodiments, network device 102 may be a switch and/or router. Network device 102 may terminate a connection with host 104, and also terminate a connection with server 106. Thus, network device 102 maintains two connections and relays communications between both connections. This allows network device 102 to perform services, such as logging, QoS shaping, charging based on data consumption, etc., when processing packets sent between host 104 and server 106.

Servers 106-1 to 106-N may be computing devices that process the communication from host 104. In some embodiments, servers 106 are SIP servers that process messages sent using the SIP protocol. A server 106 may serve as an endpoint to the communication from host 104. If the communication includes only host 104, then host 104 and server 106 communicate via network device 102. If other hosts 104 are involved in the communication, then server 106 may also communicate with the other hosts 104 by relaying messages from host 104 to the other hosts.

Network device 102 may perform load balancing to select a server 106 from the plurality of servers 106-1 to 106-N. In some embodiments, servers 106-1 to 106-N may be internal servers that do not have public addresses, such as public IP addresses. In this scenario, host 104 cannot communicate directly with servers 106-1 to 106-N. Rather, host 104 may communicate with network device 102, which has a public address. Network device 102 can communicate with servers 106-1 to 106-N because network device 102 knows the internal addresses to contact servers 106-1 to 106-N. Network device 102 may then relay the messages between host 104 and a selected server 106.

In a communication started by host 104, any server 106-1 to 106-N can process the communication. However, the IP address of each of the servers 106-1 to 106-N is internal and therefore not directly accessible by host 104 as discussed above. Host 104 thus sends the message to the public address of network device 102. Then, network device 102 selects a server 106 in a control session. A control plane 112 of network device 102 may relay messages from host 104 and the selected server 106 to set up the communication in the control session. The control plane may refer to the functions and processes that determine which path to use in the communication. For example, a process 108 running on a computer processing unit (CPU) of network device 102 may process the messages to set up the network details of the paths to use in the communication. Process 108 may then store some network details related to the communication. The network details may be information that is needed to relay communications between host 104 and server 106, such as the addresses and ports of host 104 and server 106 that will be used in the media session, and any other information that is needed in the media session.

Once the communication has been set up in a control session, process 108 may save the network details in a data plane 114. For example, process 108 saves the network details in rules 110. In some embodiments, rules 110 may be programmed in memory of network device 102, such as ternary content-addressable memory (TCAM) which may be a specialized type of high-speed memory, but other types of memory may be used.

Data plane 114 processes a media session for the communication. The data plane refers to the functions and processes that forward packets/frames from one interface to another in the media session for the communication. Data plane 114 uses the network details that were configured by control plane 112 in forwarding the packets. The media session transfers media traffic between host 104 and server 106. As opposed to the control session, the media session is not setting up a communication, but rather transferring data for the communication, such as audio from a call, messages, etc. For example, in a call, a user may speak, and data for the audio is sent in packets as media traffic. The media traffic is different from control signals, which carried information to set up the communication or media session. If a rule 110 is saved in data plane 114 that identifies host 104 and the selected server 106, data plane 114 can relay the media traffic in a media session to the same server 106 that processed the control session. In some embodiments, data plane 114 relays the media traffic at wire speed using rule 110. That is, data plane 114, such as a computer chip processing the packets of the media session, does not have to contact process 108 in control plane 112 or any other entity in control plane 112. This allows the media traffic to be processed much faster compared to if process 108 in control plane 112 was contacted during processing the media traffic, and therefore, provide better call quality and user experience.

Accordingly, using the above process, load balancing may be introduced into a communication by network device 102. Also, by saving the network details by control plane 112, the selected server 106 that processes the control session is also used during the media session as required. Further, by programming a rule 110 in data plane 114, data plane 114 may relay traffic at wire speed.

The following will now describe different parts of the process to set up the communication in the control session and also the relaying of media traffic in the media session.

Initial Communication Set-up

Network device 102 may have a public address, such as an IP address, that is accessible to host 104. For example, network device 102 may have a public address 10.0.0.254 in an address space of 10.0.0.0/16 and an internal address of 192.168.1.254 in the internal address space of 192.168.1.0/24; host 104 may have an address 10.0.0.1 in an address space of 10.0.0.0/16; and server 106 may have an address 192.168.1.1 in an address space of 192.168.1.0/24. The following will use examples of addresses in address spaces, but other addresses may be appreciated. Network device 102 may use the address of 10.0.0.254 to communicate with host 104 and the address of 192.168.1.254 to communicate with server 106.

In a flow, host 104 may send messages to network device 102, which consumes the messages. Then, network device 102 may forward the messages to a selected server 106. In some embodiments, in a control session, all traffic that is sent to network device 102 at a port may be consumed by it instead of forwarding it first. That is, control messages with SIP/SDP traffic with a destination media access controller (MAC) and IP address of network device 102 is processed by process 108 in control plane 112. In some embodiments, a custom port or set of ports may be configured in network device 102 or a port 5060 may be used for all control messages with SIP/SDP traffic.

Figure 2A:
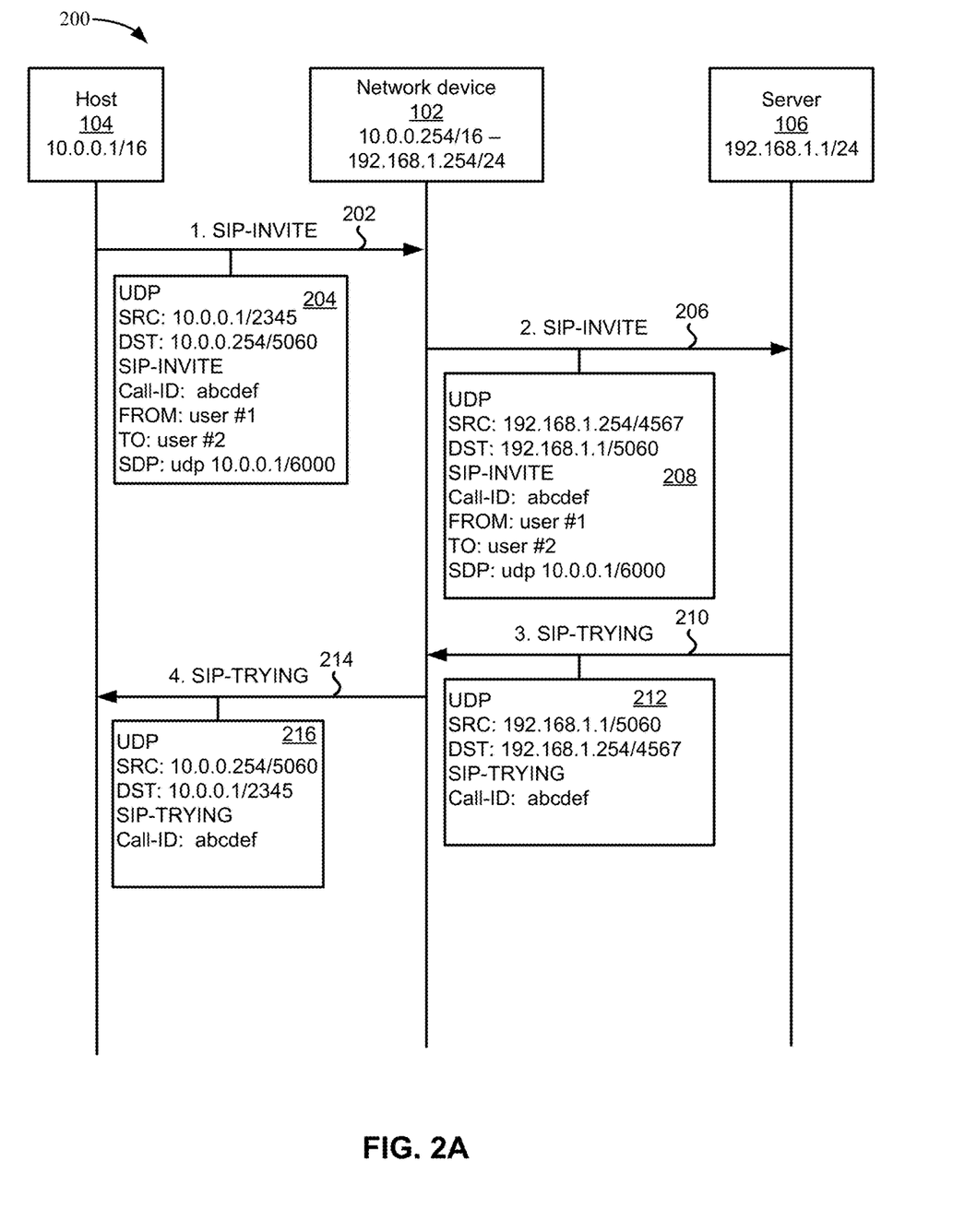
FIG. 2A depicts an example of a message flow in a control session according to some embodiments.

FIG. 2A depicts an example of a message flow in a control session according to some embodiments. At 202, host 104 sends a SIP-INVITE message that initiates the communication. Although SIP messages will be described, other messages from other protocols may be used that perform similar functions as that of the SIP messages. The user datagram protocol (UDP) may be used to carry network details for the SIP-INVITE message, but other protocols may be used. For example, in a packet shown at 204, the network details include a source (SRC) address and a destination (DST) address of 10.0.0.1/2345 and 10.0.0.254/5060, respectively. The source address is "10.0.0.1" for host 104 and a port of "2345" at host 104 is used. The destination address is "10.0.0.254" for network device 102 and a port of "5060" of network device 102 is used. This notation will be followed throughout where the address and port is listed as "address/port". The SIP-INVITE message also identifies the message as a SIP-INVITE message and includes a CALL-ID that identifies the communication, a FROM entry that identifies the caller as user #1 and a TO entry that identifies a callee of user #2. Also, an SDP entry indicates the media session will used an address and a port of UDP 10.0.0.1/6000 at host 104.

When network device 102 receives the SIP-INVITE message, network device 102 parses and saves information about the communication, such as saving network details from the payload of the packet (e.g., the address of the media session and a port, the CALL-ID, a source address and a destination address, and/or other information). The network details that are saved may be details that are needed later to relay packets in the media session. To save the network details, the packet may be forwarded to process 108, which may parse the details in the packet in control plane 112 and save the required network details for the communication.

Network device 102 then selects one of servers 106-1 to 106-N to process the communication. Once selected, network device 102 sends a copy of the SIP-INVITE message to the selected server 106 at 206. The copy of the SIP-INVITE message includes a different source address and port of 192.168.1.254/4567 and a different destination address and port of 192.168.1.1/5060 because network device 102 maintains a connection with host 104 and another connection with server 106. However, network device 102 maintains one SIP session between the two connections. The source address and port is associated with network device 102 and the destination address and port is associated with server 106. Network details in the SIP-INVITE message at 208 are similar to the information included in the SIP-INVITE message at 204 for the CALL-ID, FROM: entry, TO: entry and the media session information.

Once server 106 receives the SIP-INVITE message, server 106 may process the SIP-INVITE message, such as by performing a validation of the SIP-INVITE message. Other actions may also be appreciated.

At 210, server 106 returns a SIP-TRYING message that indicates the SIP-INVITE message was processed and validated. At 212, a packet for the SIP-TRYING message may include a source address and port of 192.168.1.1/5060, which is the source address and port of server 106, and a destination address and port of 192.168.1.254/4567, which is the destination address and port of network device 102. The SIP-TRYING message at 212 also includes identification as a SIP-TRYING message and the CALL-ID.

Network device 102 receives the SIP-TRYING message and can then relay the SIP-TRYING message to host 104 at 214. Network device 102 translates the addresses for the connection with host 104 to a source address and port of 10.0.0.254/5060 and a destination address and port of host 104 of 10.0.0.1/2345 at 216. The SIP-TRYING message at 216 also identifies the message as a SIP-TRYING message with the same CALL-ID.

At this point, network device 102 has network details of the side of the media connection with host 104 as the address and port of 10.0.0.1/6000, but not the side of the connection with server 106. For example, server 106 may allocate different ports for the media session for communications with hosts 104. Network device 102 may wait until receiving the network details from server 106 to save the network details for the side with server 106 with the network details for the side with host 104 to avoid having a rule stored for only one side. One method network device 102 may use is to save some internal state for the connection until network details for the side of the connection with server 106 are received. In some embodiments, network device 102 may store an entry in a table, such as a hash table, with a context of the connection. For example, the context may be the CALL-ID field information that is included in the SIP-INVITE and SIP-TRYING messages. The CALL-ID field may uniquely identify the connection between host 104 and server 106 at network device 102. Other contexts that can uniquely identify the communication at network device 102 may also be used.

Figure 2B:
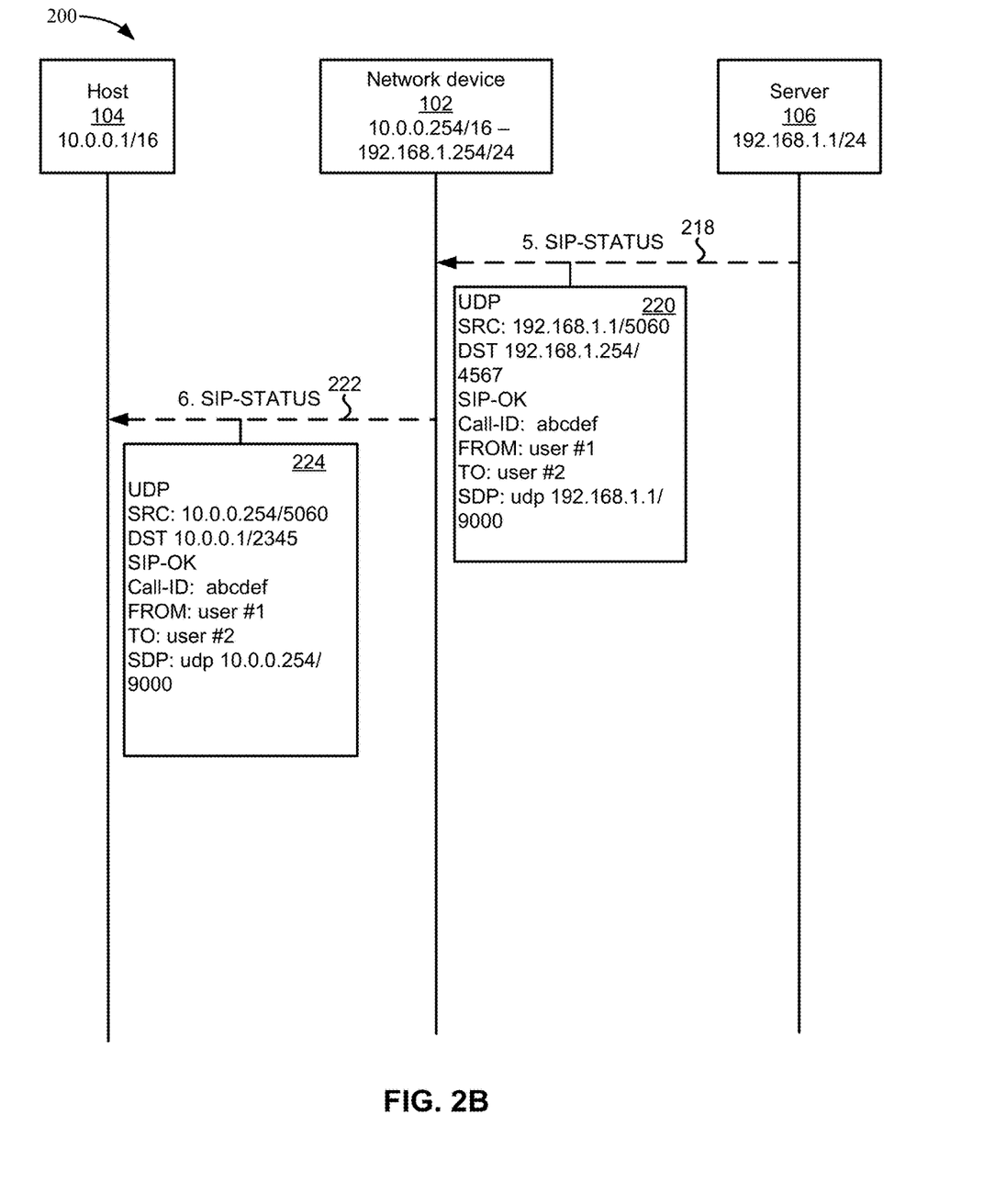
FIG. 2B depicts a continuation of the example of a message flow in a control session according to some embodiments.

FIG. 2B depicts a continuation of the example of a message flow in a control session according to some embodiments. At some point during the communication, server 106 sends a SIP-STATUS message at 218 that indicates the status of the communication. The SIP-STATUS message continues to include a source address and port of 192.168.1.1/5060 and a destination address and port of 192.168.1.254/4567. The SIP-STATUS message also identifies the message as a SIP-OK message. To send the SIP-STATUS message, server 102 may process the initial request of a communication and once it is accepted, returns a SIP-STATUS message that includes a SIP-OK indication that indicates the media connection is set up and now includes the network details for the side of the connection with server 106. For example, the network details for the media session may be the address of 192.168.1.1 and the port of 9000 for server 106. Now, network device 102 can determine the port being used by server 106 for the connection. This example may include the port of "9000".

At 222, network device 102 relays the SIP-STATUS message to host 104. Network device 102 replaces the source address in the SIP-STATUS message at 224 with its own address. For example, the SIP-STATUS message at 224 switches the address and port that will be used in the media session to the address and port of network device 102, which is the IP address of 10.0.0.254 and the port of 9000 although another port may be used if port 9000 is busy. This is because network device 102 is maintaining two connections, one with host 104 and one with server 106 as discussed above, and this forces all media traffic from host 104 to be sent to network device 102. Then, network device 102 can apply rules 110 that have been set in the data plane. Accordingly, all packets that are exchanged between host 104 and server 106 in the media session are forwarded in data plane 114 by network device 102. The forwarding does not involve process 108 and data plane 114 can forward packets at wire speed.

Figure 3:
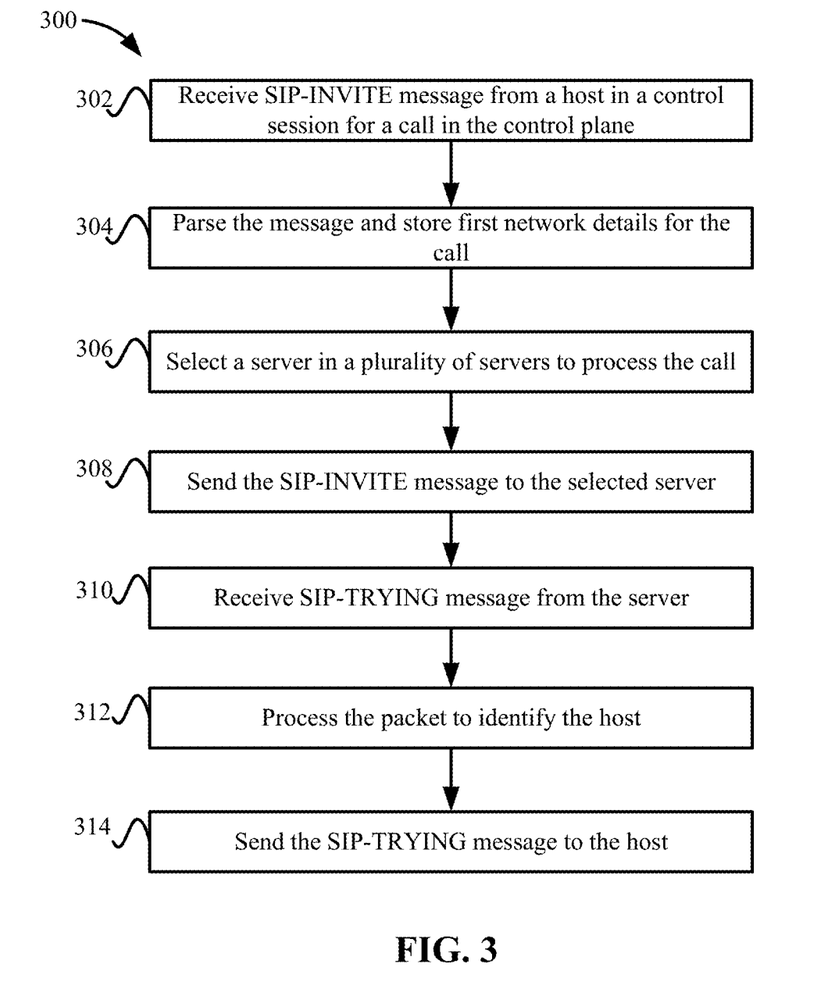
FIG. 3 depicts a simplified flowchart of a method for setting up the call according to some embodiments.

FIG. 3 depicts a simplified flowchart 300 of a method for setting up the above communication according to some embodiments. At 302, network device 102 receives a SIP-INVITE message from host 104 in a control session for a communication in control plane 112. For example, network device 102 may receive the SIP-INVITE message and forward the packet to process 108, which may process the message. At 304, process 108 processes the message and stores first network details for the communication with the side of host 104 that is needed to relay packets in the media session.

At 306, to perform load balancing, process 108 may select a server 106 in the plurality of servers 106-1 to 106-N to process the communication. Process 108 may use different factors to select server 106, such as current load being experienced by each server 106-1 to 106-N.

At 308, network device 102 sends the SIP-INVITE message to the selected server 106. At 310, network device 102 receives the SIP-TRYING message from the server 106. At 312, network device 102 processes the packet to identify host 104 as the recipient of the packet. Then, at 314, network device 102 sends the SIP-TRYING message to host 104.

Figure 4:
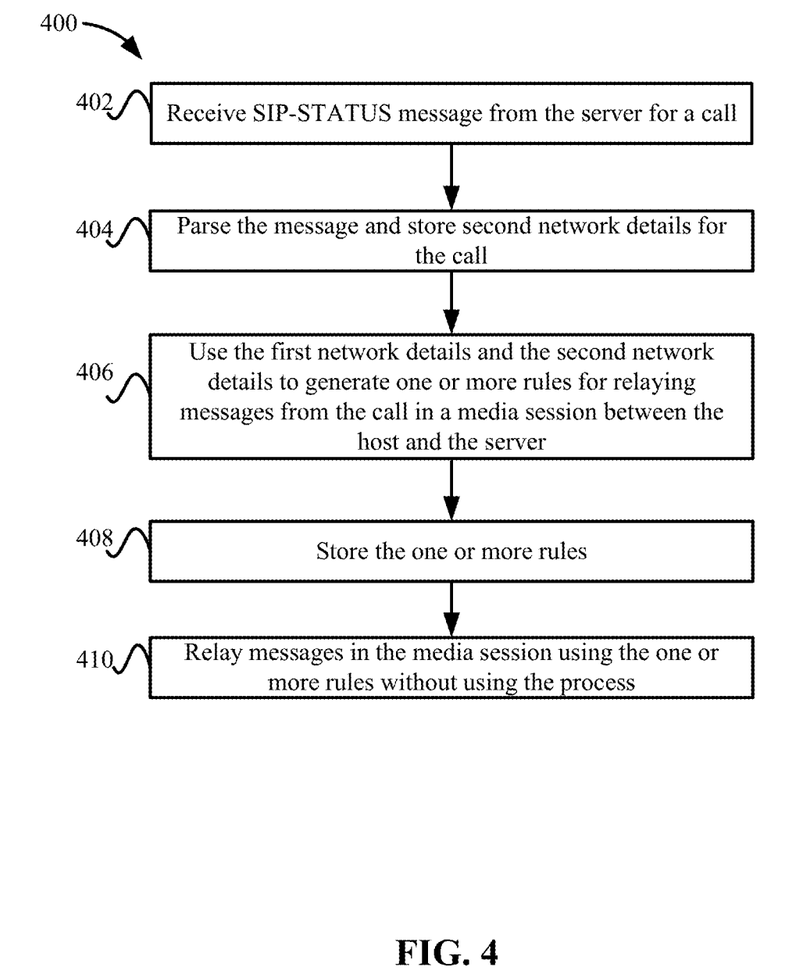
FIG. 4 depicts a simplified flowchart for saving network details for the side of the call with server 106 according to some embodiments.

FIG. 4 depicts a simplified flowchart 400 for saving network details for the side of the communication with server 106 according to some embodiments. At 402, network device 102 receives a SIP-STATUS message from server 106 for the communication. Network device 102 forwards the SIP-STATUS message to process 108. At 404, process 108 parses the message and stores second network details for the communication. The second network details are details for the side of the communication to server 106 and are needed to relay packets in the media session. Process 108 may use a context to determine the previously stored first network details for the side of the communication with host 104.

At 406, process 108 uses the first network details and the second network details to generate one or more rules 110 for relaying media traffic from the communication in a media session between host 104 and server 106. At 408, process 108 stores the one or more rules 110 in data plane 114.

At 410, data plane 114 relays media traffic in the media session using one or more rules 110. Data plane 114 relays the media traffic without the use of process 108 or a process in control plane 112.

Figure 5:
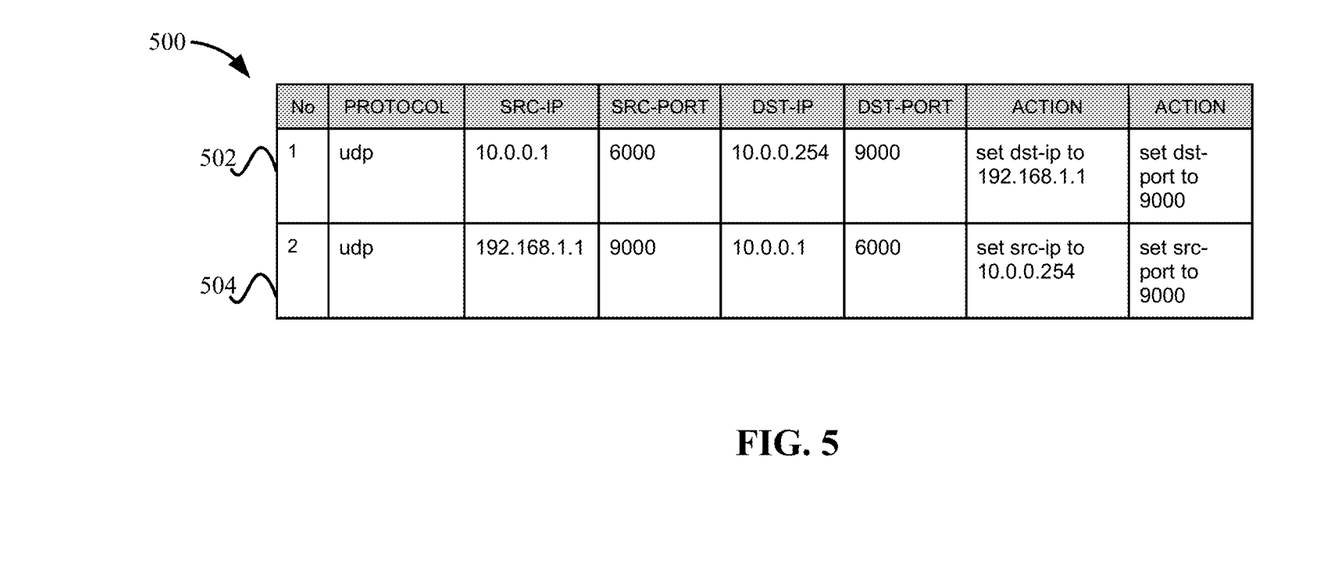
FIG. 5 depicts an example of a rule according to some embodiments.

FIG. 5 depicts an example of a rule 110 according to some embodiments. At 502, a rule #1 110 for the side of host 104 is shown. The protocol is listed as UDP, the source-IP address (SRC-IP) is 10.0.0.1 with a source port (SRC-PORT) of 6000 for host 104. A destination address (DST-IP) is 10.0.0.254 of network device 102 and a destination port (DST-PORT) is 9000 on network device 102. When rule #1 matches information in a packet, actions of set the destination IP address to 192.168.1.1, which is the destination address of server 106 and an action of set destination port to 9000, which is the port used by server 106, are included in rule #1. That is, network device 102 performs these actions when the rule is matched. Although the port is set by server 106 as port 9000, network device 102 may not be able to use port 9000. Network device 102 may advertise another port, such as port 8000, to host 104. Then, network device 102 may translate the port being sent in packets from port 8000 to port 9000 when sending packets from host 104 to server 106.

A rule #2 at 504 is for the side associated with server 106. The protocol is UDP also, and the source address is 192.168.1.1, which is the source address for server 106 and the source port is 9000, which is the port being used by server 106. The destination address is 10.0.0.1, which is the address of host 104, and the port is 6000 which is the port being used by host 104. Rule #2 includes the action to set the source address to 10.0.0.254 and also set the source port to 9000, which is the source address and port of network device 102, as advertised at 224.

Media Session

Figure 6:
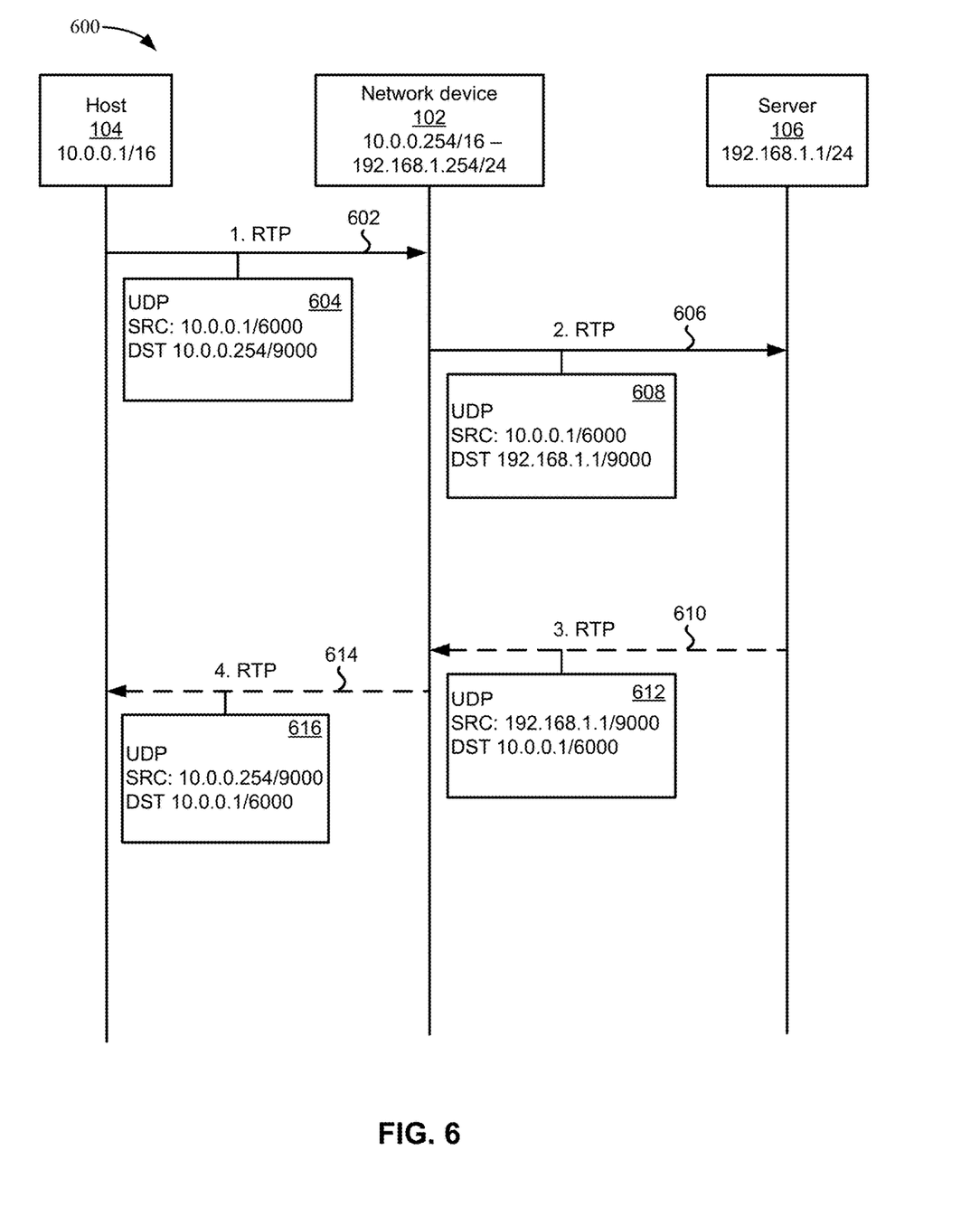
FIG. 6 depicts a flow diagram for a media session according to some embodiments.

FIG. 6 depicts a flow diagram 600 for a media session according to some embodiments. At 602, host 104 sends a packet in the media session, such as a real-time transfer protocol (RTP) packet, to network device 102. The packet at 604 uses UDP and includes a source address and a port of 10.0.0.1/6000 of host 104 and destination address and port of 10.0.0.254/9000 for network device 102. The packet may include content, such as voice, video, or messages from host 104.

Network device 102 (e.g., a chip that processes packets in network device 102) then determines if information in the packet meets any rules 110. For example, rule #1 at 502 in FIG. 5 matches the source address and destination address of the rule. In this case, data plane 114 in network device 102 forwards the packet to server 106. For example, a chip, such as an application-specific integrated circuit (ASIC), may process the packet in data plane 114 and forwards the packet to server 106. The forwarding may be performed without sending the packet to the CPU and/or process 108 that was used in control plane 112. For example, the rule sets the destination address to 192.168.1.1 and the destination port to 9000, which is the destination address and port for server 106.

At 606, network device 102 sends the RTP packet to server 106 in the media session. The packet at 608 uses UDP and includes a source address and port of 10.0.0.1/6000 for host 104 and a destination address and port of 192.168.1.1/9000 for server 106. Server 106 may process the packet and return a packet at 610. The packet at 612 uses UDP and includes a source address and port of 192.168.1.1/9000 of server 106 and includes a destination address and port of 10.0.0.1/6000, which is a destination address and a port used by host 104 in the media session. Network device 102 determines if the packet at 612 meets any rules, and the packet at 612 meets rule #2. For example, the source address and port and the destination address and port match rule #2. Data plane 114, such as in the chip described above, then sets the source IP address to 10.0.0.254 and the port to 9000, which is the address and the port of network device 102 that is being used for the connection with host 104.

At 614, network device 102 relays the RTP packet to host 104. The packet at 616 includes the source address and port of 10.0.0.254/9000, which is the source address and port for network device 102, and the destination address and port of 10.0.0.1/6000, which is the address and port being used by host 104 for the communication.

Accordingly, network device 102 may use the rules to forward the media traffic based on packets meeting the parameters of rules 110. The actions performed by network device 102 may include changing the destination address/port or the source address/port depending on where the packet is being forwarded, such as to host 104 or server 106.

The changing of the destination address/port and the source address/port allows network device 102 to be situated in between host 104 and server 106 in the communication.

Media Session End

When the media session ends, one of an end point may send a SIP-BYE packet to end the session. Any side of the communication may send the packet, such as host 104, server 106, or another host 104 that is at the other end of the communication.

Figure 7:
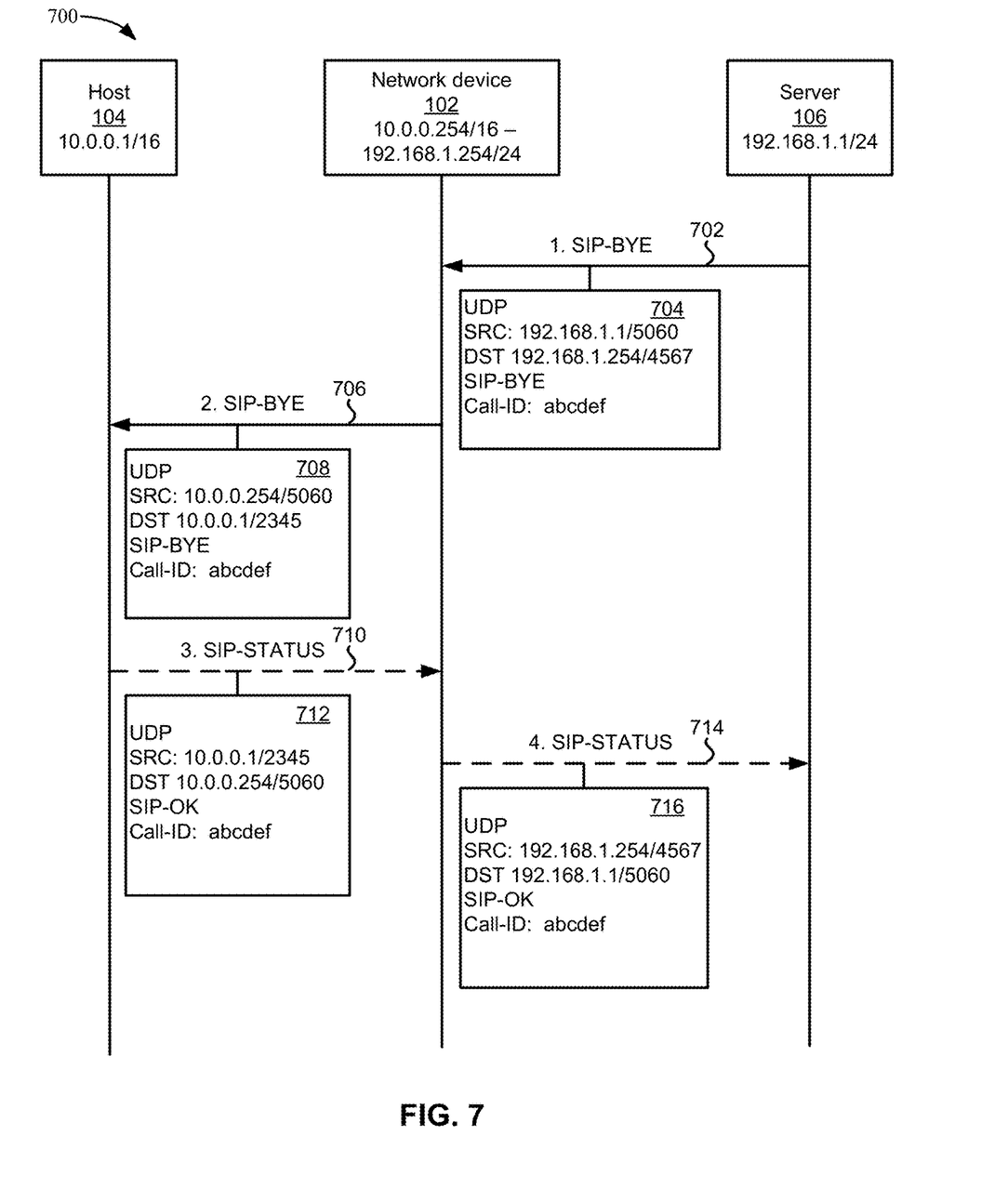
FIG. 7 depicts a call flow of a method for ending a session according to some embodiments.

FIG. 7 depicts a communication flow 700 of a method for ending a session according to some embodiments. In this example, server 106 may initiate a SIP-BYE message at 702. In other examples, server 106 may have received a SIP-BYE message from another host 104 and relays the SIP-BYE message to host 104. A packet at 704 includes a source address and port of 192.168.1.1/5060 of server 106 and a destination address and port of 192.168.1.254/4567 of network device 102 and is a SIP-BYE message. The SIP-BYE message is a control message and processed by control plane 112, such as by process 108. Process 108 may parse the packet at 704 and save network details for the communication. In some embodiments, process 108 may save the source address/port and destination address/port and CALL-ID of "abcdef" for the communication.

At 706, process 108 of network device 102 relays a copy of the SIP-BYE message to host 104. The packet at 708 includes a source address and port of 10.0.0.254/5060 for network device 102, and a destination address and port of 10.0.0.1/2345 for host 104. The packet at 708 identifies the message as a SIP-BYE message with a CALL-ID of "abcdef".

At 710, host 104 sends a SIP-STATUS message with a status of SIP-OK. The packet at 712 includes a source address and port of 10.0.0.1/2345 for host 104 and a destination address and port of 10.0.0.254/5060 for network device 102. The packet at 712 also identifies the message as a SIP-OK message with the CALL-ID of "abcdef".

Process 108 in control plane 112 consumes the packet and can determine network details from the packet. In this example, network device 102 can determine rules 110 and match the network details for the media session to be ended. For example, the CALL-ID can be used to identify the associated rules of this connection and delete rule #1. Also, the CALL-ID from the SIP-BYE can again be used to identify the remaining rule #2 for this connection and delete it. Process 108 may use the CALL-ID to identify and search rules for connections with the source address and destination address received from server 106 and host 104 to end the media session.

At 714, process 108 of network device 102 may relay the SIP-STATUS message to server 106. The SIP-STATUS message is a control message and processed by control plane 112, such as by process 108. The packet at 716 identifies the source address and port of 192.168.1.254/4567 for network device 102, and the destination address and port of 192.168.1.1/5060 for server 106. This effectively ends the media session and rules 110 for the media session have been deleted from memory of network device 102.

Network Device

Figure 8:
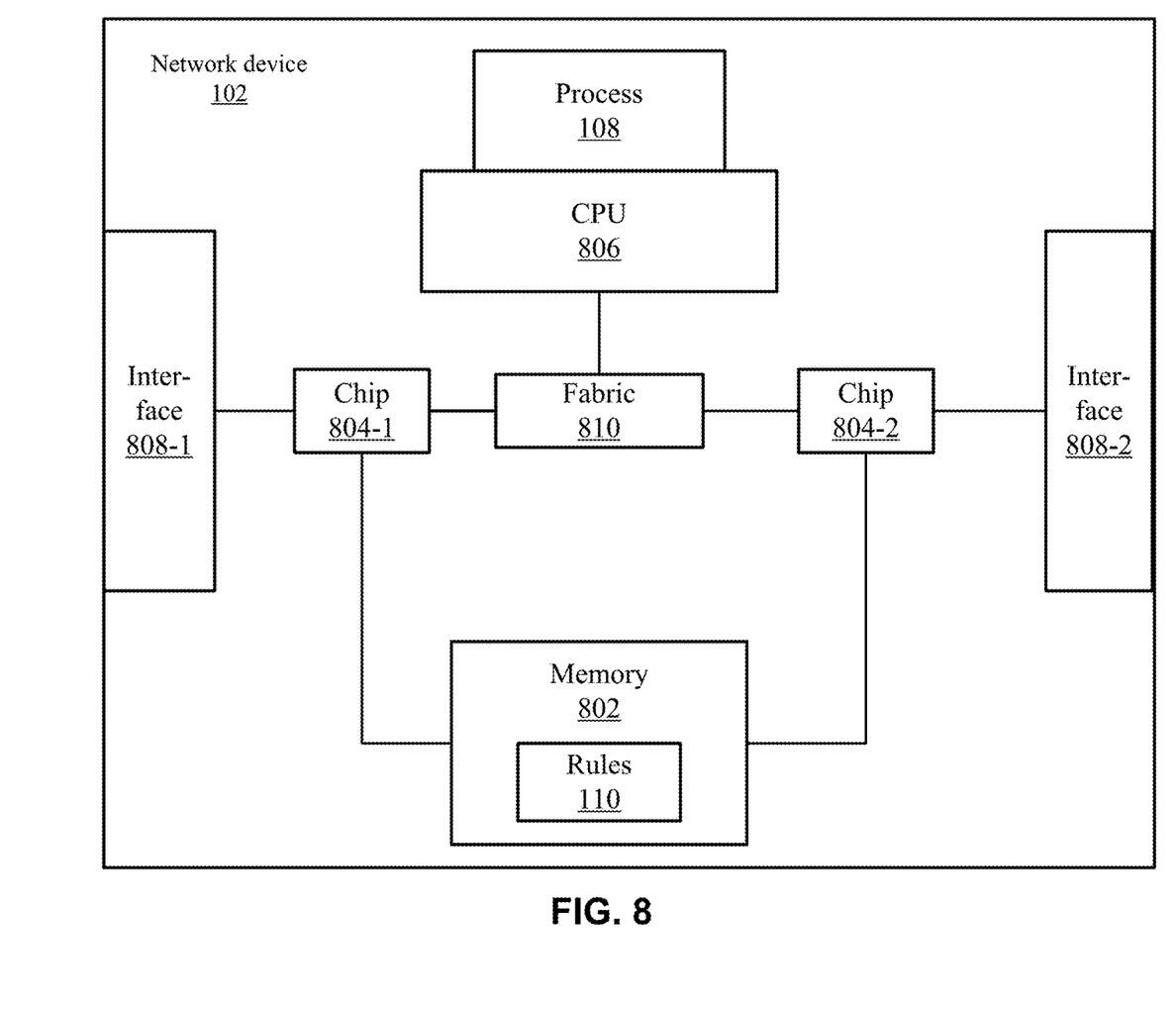
FIG. 8 depicts an example of network device according to some embodiments.

FIG. 8 depicts an example of network device 102 according to some embodiments. Network device 102 includes an interface 808-1 on the side of host 104. Additionally, network device 102 includes an interface 808-2 on the side of server 106. A chip 804-1 in data plane 114 processes packets being received from host 104 and sent to host 104. A fabric 810 forms a network between chip 804-1 and chip 804-2. Additionally, fabric 810 interconnects chip 804-1 and chip 804-2 with CPU 806. Process 108 may run on top of CPU 806. Chip 804-2 may process packets from server 106 and packets to server 106. When network device 102 receives a packet from host 104 for server 106, the packet ingresses at interface 808-1 to chip 804-1. Chip 804-1 determines the forwarding destination for the packet and possibly applies rules to the packet. After the decision is taken to forward this packet to server 106, the packet is sent via fabric 810 to chip 804-2 whose interface 808-2 is directly connected to server 106. When the chip 804-2 receives the packet sent by chip 804-1, chip 104-2 determines a forwarding decision was already determined for this packet and sends the packet to server 106 via interface 808-2. The reverse process may be performed for a packet sent from server 106 to host 104. When process 108 is used to process packets during the control session, chips 804-1 and 804-2 forward packets to process 108. During the media session, chips 804-1 and 804-2 do not forward the packets to process 108, but rather process the packets in data plane 114 without communication with process 108. For example, chips 804-1 and 804-2 use rules 110 in memory 802 to relay the packets between host 104 and server 106.

Network Address Translation

In some embodiments, host 104 may be behind a network address translation (NAT). The address of server 106 is already not public and visible by host 104, but network device 102 allows access to server 106. However, when host 104 is behind a NAT device, network device 102 may not be able to directly communicate with host 104. Some embodiments may use techniques to overcome use of the NAT device. For example, a device with a public address for media relay may be used such that host 104 has a known address that can be used. The media relay may change the addresses in the packets so that the packets can be used in the above process. Host 104 believes that it is talking to server 106 or another host, whereas the other end believes it is talking directly to host 104. The above process works when network device 102 is placed after the media relay, such as on a hop farther from the host 104 and the media relay. Network device 102 can use an address provided by media relay as the address for host 104 and balance the load as described above.

Accordingly, network device 102 allows load balancing to be performed for a communication while allowing the same server 106 to be used for the control session and the media session. Further, the relaying of media traffic is improved by storing rules 110 in data plane 114 such that network device 102 can relay packets in the media session at wire speed via chips 104.

Example Embodiments

In some embodiments, a method for load balancing, the method comprising: receiving a session initiation protocol (SIP) message for a communication from a host; selecting a server from a plurality of servers to process the communication; relaying SIP messages between the host and the server in a control plane to set up the communication; saving network details for the server and the host in a control plane; programming the network details in a rule in a data plane; and relaying media traffic between the host and the server for a media session for the communication using the network details in the rule in the data plane.

In some embodiments, selecting the server from the plurality of servers comprises: determining status information for one or more of the plurality of servers; and selecting the server based on the status information.

In some embodiments, saving the network details comprises: saving first network details associated with the host from a first SIP message; and saving second network details associated with the server from a second SIP message.

In some embodiments, a process running on a computer processing unit (CPU) programs the network details in the rule in the data plane.

In some embodiments, relaying media traffic between the host and the server for the media session is performed without the process.

In some embodiments, a method for load balancing, the method comprising: selecting a server from a plurality of servers to process a communication from a host; saving network details for the server and the host during a control session to set up the communication; storing the network details in a rule in a data plane; and relaying messages between the host and the server for a media session for the communication using the network details in the rule in the data plane.

In some embodiments, saving network details comprises: receiving a first message for the communication, and saving first network details for the communication from the first message.

In some embodiments, saving network details comprises: receiving a second message for the communication, and saving second network details for the communication from the second message, wherein the first network details and the second network details are used to relay the messages between the host and the server for the media session.

In some embodiments, the first network details comprises information associated with the host, and the second network details comprises information associated with the server.

In some embodiments, saving the second network details comprises: storing a context for the communication; and using the context to identify that the second message is associated with the first network details for the communication is received from server, wherein the second network details is stored from the second message upon identifying the second message is associated with the first network details for the communication.

In some embodiments, storing the network details in the rule comprises: storing the rule in memory used by a computer chip to process the messages between the host and the server in the media session.

In some embodiments, relaying the messages between the host and the server comprises: receiving a first message; retrieving communication information for the first message; identifying the rule in a plurality of rules as applying to the first message based on the communication information and the network details in the rule; and selecting the host or the server based on the rule, wherein the host or the server is sent the first message.

In some embodiments, a process running on a computer processing unit (CPU) programs the network details in the rule in the data plane.

In some embodiments, relaying media traffic between the host and the server for the media session is performed without the process.

In some embodiments, an apparatus comprising: one or more computer processors; and a computer-readable storage medium comprising instructions for controlling the one or more computer processors to be operable for: selecting a server from a plurality of servers to process a communication from a host; saving network details for the server and the host during a control session to set up the communication; storing the network details in a rule in a data plane; and relaying messages between the host and the server for a media session for the communication using the network details in the rule in the data plane.

In some embodiments, saving network details comprises: receiving a first message for the communication, and saving first network details for the communication from the first message.

In some embodiments, saving network details comprises: receiving a second message for the communication, and saving second network details for the communication from the second message, wherein the first network details and the second network details are used to relay the messages between the host and the server for the media session.

In some embodiments, storing the network details in the rule comprises: storing the rule in memory used by a computer chip to process the messages between the host and the server in the media session.

In some embodiments, relaying the messages between the host and the server comprises: receiving a first message; retrieving communication information for the first message; identifying the rule in a plurality of rules as applying to the first message based on the communication information and the network details in the rule; and selecting the host or the server based on the rule, wherein the host or the server is sent the first message.

In some embodiments, a process running on a computer processing unit (CPU) programs the network details in the rule in the data plane.

System

Figure 9:
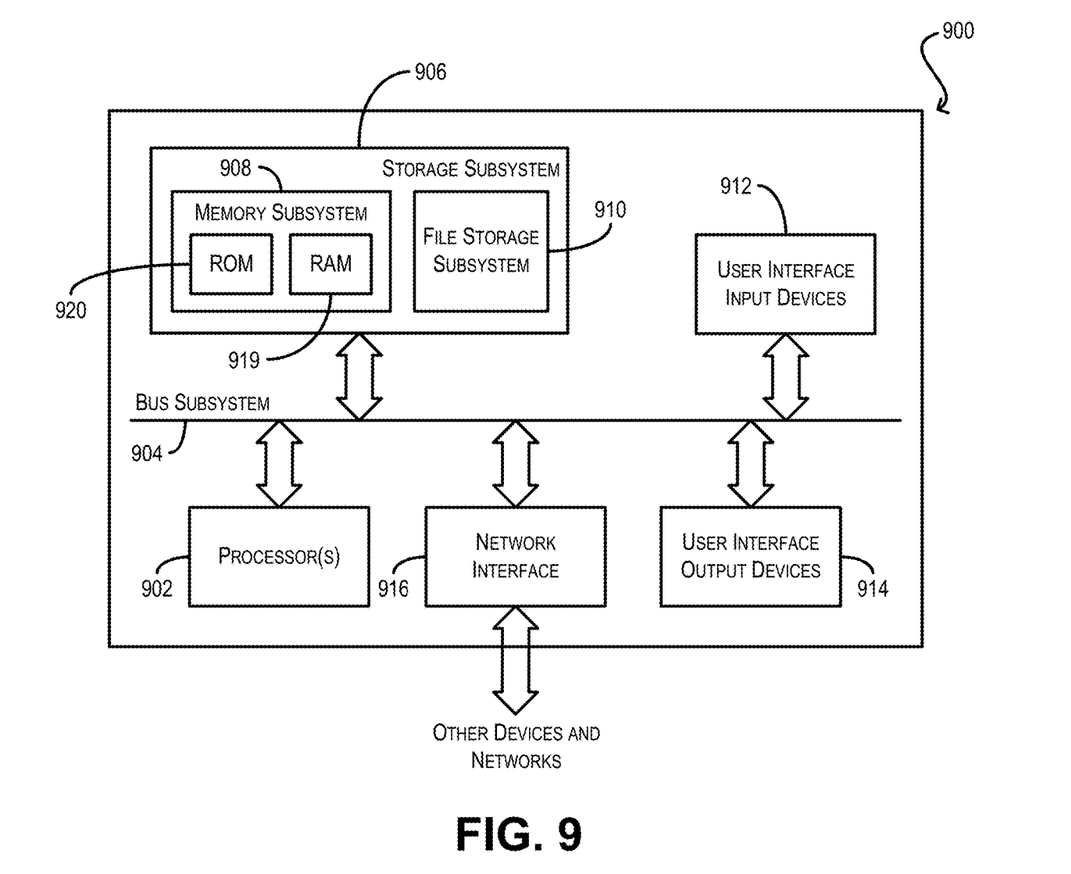
FIG. 9 depicts an example computer system according to some embodiments.

FIG. 9 depicts an example computer system 900 according to some embodiments. Computer system 900 can be used to implement any of the computing devices, systems, or servers described in the foregoing disclosure. As shown in FIG. 9, computer system 900 includes one or more processors 902 that communicate with a number of peripheral devices via a bus subsystem 904. These peripheral devices include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple buses.

Network interface subsystem 916 can serve as an interface for communicating data between computer system 900 and other computer systems or networks. Embodiments of network interface subsystem 916 can include, e.g., an Ethernet card, a Wi-Fi and/or cellular adapter, a modem (telephone, satellite, cable, ISDN, etc.), digital subscriber line (DSL) units, and/or the like.

User interface input devices 912 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 900.

Storage subsystem 906 includes a memory subsystem 908 and a file/disk storage subsystem 910. Subsystems 908 and 910 represent non-transitory computer-readable storage media that can store program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method for load balancing, the method comprising:
   receiving, by a network device, a session initiation protocol (SIP) invite message for a communication from a host, the network device comprising a control plane and a data plane;
   selecting, by the network device, a server from a plurality of servers to process the communication;
   relaying, by the network device, SIP messages between the host and the selected server in the control plane over a control session to set up the communication, at least some of the SIP messages including a first destination port of the selected server, an SIP message of the SIP messages being an SIP-TRYING message generated by the selected server responsive to the SIP-INVITE message from the host;
   determining, by the network device, network details for the selected server and the host using at least one SIP message of the SIP messages;
   saving, by the network device, network details for the selected server and the host in the control plane, the control plane providing the network details to the data plane;
   programming, by the network device, the network details in a rule in the data plane, the rule identifying the host and the selected server; and
   relaying, by the network device, media traffic between the host and the selected server in the data plane over a media session for the communication using the rule, at least some of the media traffic including a second destination port of the server.

2. The method of claim 1, wherein selecting the server from the plurality of servers comprises:
   determining status information for one or more of the plurality of servers; and
   selecting the server based on the status information.

3. The method of claim 1, wherein saving the network details comprises:
   saving first network details associated with the host from a first SIP message; and
   saving second network details associated with the selected server from a second SIP message.

4. The method of claim 1, wherein a process running on a computer processing unit (CPU) programs the network details in the rule in the data plane.

5. The method of claim 1, wherein the control session and the media session use different protocols.

6. The method of claim 1, wherein the control session uses session description protocol and the media session uses real-time transfer protocol.

7. A method for load balancing by a network device, the network device comprising a control plane and a data plane, the method comprising:
   selecting a server from a plurality of servers to process a communication from a host;
   relaying messages between the host and the selected server in the control plane over a control session to set up the communication, at least some of the messages including a first destination port of the selected server;
   determining network details for the selected server and the host using at least one message of the messages;
   programming the network details in a rule in the data plane, the rule identifying the host and the selected server, the control plane providing the network details to the data plane; and
   relaying media traffic between the host and the selected server in the data plane over a media session for the communication using the network details, at least some of the media traffic including a second destination port of the selected server.

8. The method of claim 7, wherein determining network details comprises:
   receiving a first message for the communication, and
   saving first network details for the communication from the first message.

9. The method of claim 8, wherein determining network details comprises:
   receiving a second message for the communication, and
   saving second network details for the communication from the second message, wherein the first network details and the second network details are used to relay the media traffic between the host and the selected server for the media session.

10. The method of claim 9, wherein:
    the first network details comprise information associated with the host, and the second network details comprise information associated with the selected server.

11. The method of claim 9, wherein saving the second network details comprises:
storing a context for the communication; and
using the context to identify that the second message is associated with the first network details for the communication is received from selected server, wherein the second network details is stored from the second message upon identifying the second message is associated with the first network details for the communication.

12. The method of claim 7 further comprising:
storing the network details in a rule in a data plane, the rule being stored in memory used by a computer chip to process the media traffic between the host and the selected server in the media session.

13. The method of claim 12, wherein relaying the media traffic between the host and the selected server comprises:
receiving a first message;
retrieving communication information for the first message;
identifying the rule in a plurality of rules as applying to the first message based on the communication information and the network details in the rule; and
selecting the host or the selected server based on the rule, wherein the host or the selected server is sent the first message.

14. The method of claim 12, wherein a process running on a computer processing unit (CPU) programs the network details in the rule in the data plane.

15. An apparatus comprising:
a data plane; and
a control plane comprising one or more computer processors, and a computer-readable storage medium comprising instructions for controlling the one or more computer processors to be operable for:
selecting a server from a plurality of servers to process a communication from a host; and
relaying at least one message between the host and the selected server in the control plane over a control session to set up the communication; and
saving network details for the selected server and the host in the control plane using the at least one message wherein:

the control plane provides the network details to the data plane;
the network details are programmed in a rule in the data plane;
the rule identifies the host and the selected server; and
media traffic between the host and the selected server are relayed in the data plane over a media session for the communication using the network details.

16. The apparatus of claim 15, wherein saving network details comprises:
receiving a first message for the communication, and
saving first network details for the communication from the first message.

17. The apparatus of claim 16, wherein saving network details comprises:
receiving a second message for the communication, and
saving second network details for the communication from the second message, wherein the first network details and the second network details are used to relay the media traffic between the host and the selected server for the media session.

18. The apparatus of claim 15 wherein the method further comprises:
storing the network details in a rule in a data plane, the rule being stored in memory used by a computer chip to process the media traffic between the host and the selected server in the media session.

19. The apparatus of claim 18, wherein a process running on a computer processing unit (CPU) programs the network details in the rule in the data plane.

20. The apparatus of claim 15, wherein relaying the media traffic between the host and the selected server comprises:
receiving a first message;
retrieving communication information for the first message;
identifying the rule in a plurality of rules as applying to the first message based on the communication information and the network details in the rule; and
selecting the host or the selected server based on the rule, wherein the host or the selected server is sent the first message.

* * * * *